Patented Apr. 1, 1930

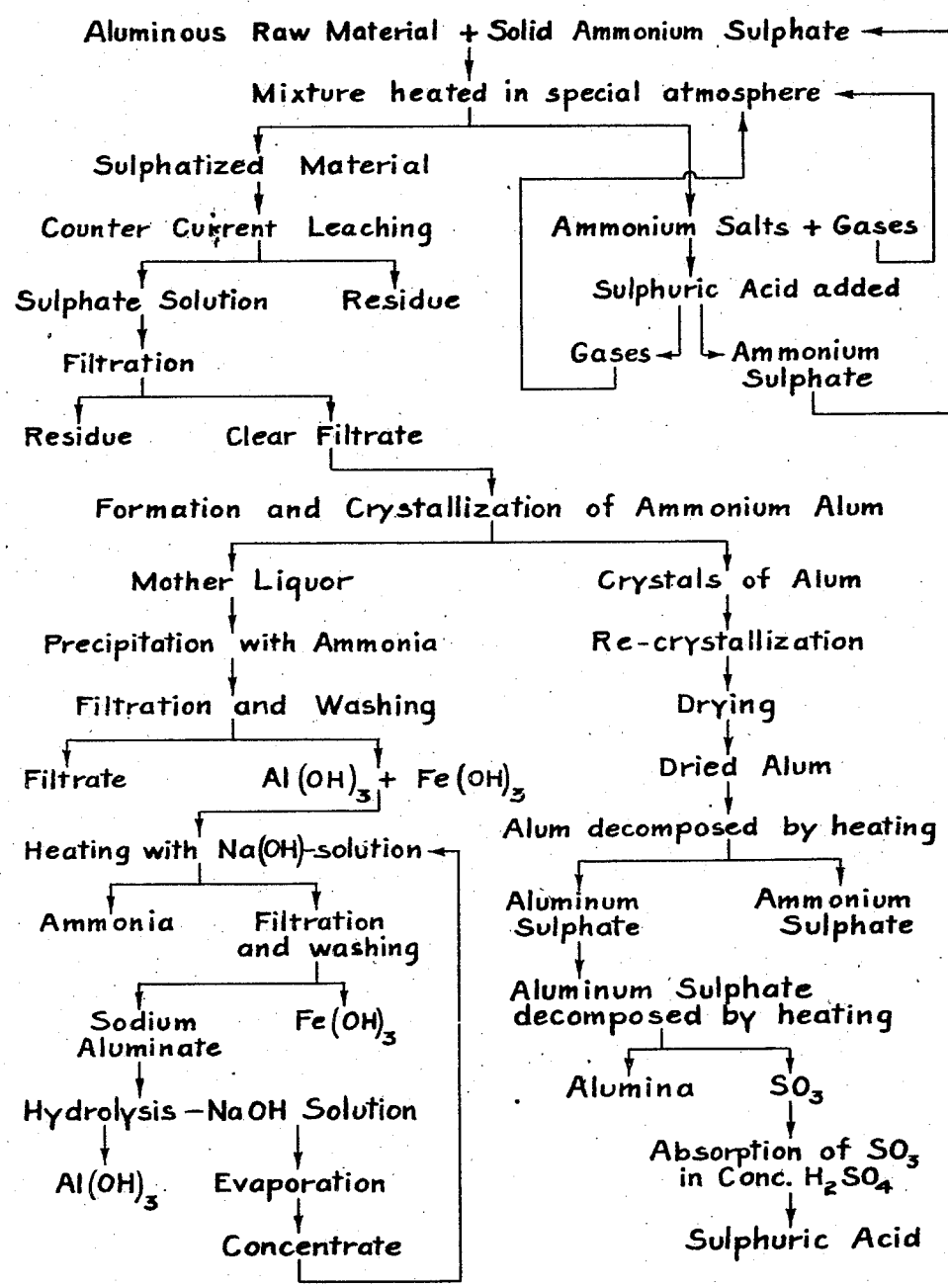

1,752,599

UNITED STATES PATENT OFFICE

BENGT RAGNAR FRITIOF KJELLGREN, OF CLEVELAND, OHIO

METHOD OF TREATING ALUMINOUS MATERIALS FOR THE PRODUCTION OF ALUMINUM SULPHATE AND ALUMINA THEREFROM

Application filed August 17, 1925, Serial No. 50,848, and in Sweden June 27, 1925. Renewed July 22, 1929.

My invention is an improvement of a process for production of aluminum compounds from aluminous raw materials described in my patent application, Serial Number 733,852, August 23rd, 1924. The described process is in short that an aluminous raw material is sulphatized in well known manner, the sulphates leached out and an ammonium salt added, ammonium alum crystallized, dried, and decomposed by heating into ammonium sulphate and anhydrous aluminum sulphate, and, if desired, the aluminum sulphate further decomposed by heating into alumina and sulphur oxides, that are easily converted into sulphuric acid. The recovered acid and the ammonium sulphate are used again in the process. In order to prevent loss of ammonia by the decomposition of ammonium alum it is further an advantage to pass gases of certain acids, the ammonium salts of which sublime without loss of ammonia, over the heated alum. Such acids are for example hydrochloric acid and sulphurous acids.

The introduction of ammonium alum as a means for producing cheap aluminum sulphate and alumina for practical purposes has brought forth several improvements in treating aluminous raw materials for the production of aluminum compounds. The reason for this fact is that free ammonia can be employed in the process, the use of which makes it possible to overcome losses of sulphuric acid, and at the same time secure a high yield of aluminum sulphate from the raw material. Besides, new methods have been found to decompose ammonium alum so that ammonium sulphate can be recovered therefrom almost without loss of either ammonia or sulphuric acid.

By treating an aluminous raw material, for example a clay, with sulphuric acid for production of aluminum sulphate, some acid always is lost. Other oxides than alumina, especially iron oxides, consume acid; if the clay is used in excess basic aluminum sulphates are formed, which remain in the residue after leaching and cause losses both of acid and alumina; if the acid is used in excess, it remains in the mother liquor after crystallization of the aluminum sulphate and cannot be recovered economically, or it must be neutralized with a base; it is also difficult to wash the residue free from the free acid. These losses can be avoided or essentially reduced by the production of ammonium alum, if free ammonia is introduced in the process. The process may be carried out, for example, according to the scheme in the accompanying drawing, however, it being understood that the invention is not limited to this scheme, which only serves as an illustration of the process.

To secure a high yield of alumina from the aluminous raw material the sulphuric acid may be used in some excess, for example 5–10%. Also ammonium sulphate can advantageously be used for sulphatizing the material as will be explained later. After the sulphatization in well known manner the material is leached with the filtrate derived from the filtration of the aluminum and iron hydroxides precipitated with ammonia from the mother liquor, from the first crystallization of the ammonium alum. This filtrate is completely free from iron, but contains such sulphates that cannot be precipitated with ammonia, as for example alkali sulphates; besides it contains ammonium sulphate formed by the reaction. The sulphuric acid corresponding to the aluminum and iron content in the mother liquor, therefore, is saved by converting it into ammonium sulphate, that can be utilized for the formation of ammonium alum.

When free acid is present, for example when it is used in excess in order to obtain a high yield from the raw material, the excess acid may be neutralized, or partially neutralized, before the filtration. The aluminum hydroxide produced from the mother liquor from the first crystallization of ammonium alum and even ammonia may be used for this purpose. Hereby the acid is converted into aluminum sulphate and ammonium sulphate, that later form ammonium alum, thus, the excess acid is saved and utilized. By using an acid of proper concentration in excess, of course, neither basic nor acid aluminum sulphates, that are difficult to be leached out, are formed.

The neutralization, either complete or in part, has also other practical advantages. Excess free acid is difficult to wash out from the residue with reasonable amount of water, but by converting the acid into salts, the washing is very much easier to carry out effectively. Besides the neutralization has the effect that the corrosion of filter presses and filter cloth is much less than for a strong sulphuric acid sludge.

The extraction of the sulphates from the sulphatized material may be accomplished preferably by using the counter current leaching procedure, as described in my application Serial No. 733,852, filed August 23, 1924.

After the filtration the sulphate solution is, if necessary, mixed with more ammonium sulphate or other ammonium salts, so that the amount of ammonium sulphate corresponds to the amount of aluminum sulphate present. The solution is further heated in order to dissolve the ammonium salts, if they are added in solid form, and then the alum is crystallized by cooling, or evaporation and cooling. For crystallization only by cooling the precedent leaching must be carried out at high temperature.

After separation of the crystals some part of the mother liquor generally can be used directly for leaching again. The part not used for leaching is treated with ammonia in order to free the liquor from aluminum and iron. The aluminum and iron hydroxides are separated by filtration and washed with hot water, preferably water of condensation from the drying of the ammonium alum. The filtrate is used for leaching as described above. If the quantity of the aluminum and iron hydroxides is comparatively large, the hydroxides may still contain some ammonium sulphate. By dissolving the aluminum hydroxide in sodium hydroxide for separation from the iron hydroxide, the mixture therefore is heated to drive off all ammonia, so as to avoid this loss of ammonia. Of course, some sodium hydroxide instead is lost, but this is cheaper; besides the sodium sulphate formed comes out later by the concentration of the sodium hydroxide and may be sold as a byproduct. The separated iron hydroxide may also be of value, if it is present in considerable amount. The sodium aluminate is hydrolyzed in well known manner. The obtained aluminum hydroxide may be used for neutralization as above, or may be converted into other aluminum compounds.

According to this method, therefore, ammonium alum is produced from an aluminous material without any more loss of acid, than corresponds to oxides in the raw material, the salts of which cannot be precipitated with ammonia.

In a case where the raw material contains so much iron that the amount of ammonium sulphate formed by the precipitation of the iron hydroxide is larger than corresponds to the aluminum sulphate present, only such part of the mother liquor may be precipitated with ammonia, that gives the proper quantity ammonium sulphate. The other part is distilled with a cheap base, for example lime, in order to recover the ammonia content. The aluminum content of the slime after the distillation may be extracted with sodium hydroxide and aluminum hydroxide produced from the sodium aluminate in well known manner.

The alum crystals from the first crystallization may be purified by re-crystallization. Before the decomposition of the pure alum, it has to be dried. By the drying of the alum there are certain practical difficulties depending upon the formation of a sticky mass, that causes swelling of the material. This difficulty has been overcome by drying the crystals to some degree in vacuum and then further by direct heating at atmospheric pressure. For example, about 40% of the water of crystallization was first driven off at about 75° C. and 20-30 mm. vacuum. By this treatment the crystals neither melted nor swelled and could easily be dried further in open air by direct heating without any further swelling.

For the production of aluminum sulphate from the dried alum, the ammonium sulphate has to be separated. This can be done by direct heating for sublimation of the ammonium sulphate, but then always some ammonia is lost by oxidation to nitrogen. This can be prevented, as mentioned in the first application, Serial Number 733,852, filed August 23, 1924, by passing gases of suitable acid over the alum, for example, sulphurous acid, which forms ammonium sulphite subliming without loss of ammonia.

It is evident that the oxidation of the ammonia is caused by the dissociation of the ammonium sulphate by heating. The main dissociations, that take place, can be shown by following reactions:

(1) $(NH_4)_2SO_4 \rightleftharpoons 2NH_3 + SO_3 + H_2O$
(2) $2NH_3 \rightleftharpoons N_2 + 3H_2$
(3) $2SO_3 \rightleftharpoons 2SO_2 + O_2$ The primary dissociation (1) causes no direct loss, because if no other dissociation occurred, the decomposition products by cooling would re-combine and form ammonium sulphate again.

On the other hand, the secondary dissociations (2) and (3) cause the losses of ammonia and sulphuric acid formed by the primary dissociation (1).

As soon as the dissociations (2) and (3) commence, if only to a small degree at the sublimation temperature in question, the liberated hydrogen and oxygen are combined to form water. Both the equilibria (2) and (3) then are destroyed and new quantities of ammonia and sulphur trioxide must decompose according to the law of mass action. In this manner a large part of the ammonia present may be oxidized and the ammonium sulphate may be completely decomposed as follows:

(4) $3(NH_4)_2SO_4 = 2(NH_4)_2SO_3 + SO_2 + N_2 + 4H_2O.$

As ammonium sulphite sublimes without loss the final decomposition products of ammonium sulphate by heating are the products formed according to this action.

When the various reactions, that take place by the decomposition of ammonium sulphate, are understood, it is easy to see that the loss of ammonia and sulphuric acid can be prevented or minimized by subliming the ammonium sulphate in an atmosphere containing any product or mixture of the products formed by its decomposition. Evidently any such product present in excess tends to prevent the dissociation according to the law of mass action.

Theoretically, the primary dissociation (1) can be minimized by subliming the ammonium sulphate in an atmosphere of ammonia, sulphuric acid or water.

The dissociation of ammonia (2) can be minimized by using an atmosphere of nitrogen or hydrogen. However, hydrogen is not suitable for the sublimation of ammonium sulphate as it reduces all sulphuric acid present to sulphur dioxide.

The dissociation of sulphur trioxide (3) can be minimized by using an atmosphere of oxygen or sulphur dioxide. Of course, oxygen cannot be used as it oxidizes the ammonia, but sulphur dioxide has an exceedingly good effect. It prevents the loss of sulphuric acid by minimizing the dissociation of sulphur trioxide. It does not oxidize ammonia and it forms ammonium sulphite that can be sublimed without loss.

It will thus be seen that sulphur dioxide or sulphurous acid is one of the best acid gases which can be used to recover the ammonia and the sulphuric acid upon the decomposition of ammonium alum. It is, of course, possible, as mentioned in my application, Serial No. 733,852, filed August 23, 1924, to use any acid whose ammonium salts sublime with low loss of ammonia as for example hydrochloric acid, but sulphur dioxide is preferable in practice, because it is less corrosive.

The temperatures employed for the decomposition of ammonium alum into ammonium sulphate and aluminum sulphate vary in different methods from about 300° C. to about 550° C. Generally the temperature range between 440° to 525° C. is best for practical purposes, because the rate of evaporation of ammonium sulphate at these temperatures is effective and the aluminum sulphate is not decomposed. By higher temperatures not only the loss of ammonia increases, but an insoluble basic aluminum sulphate is formed. Of course, the formation of an insoluble aluminum sulphate does not matter in case of producing alumina, but is only a disadvantage in the aluminum sulphate production.

For the production of alumina free ammonia can be liberated from the ammonium alum. This may be an advantage, when free ammonia is not otherwise available. If ammonium alum is mixed with aluminum hydroxide and heated, most of the ammonia is driven off between 300° C. and 400° C. If the temperature is kept higher also some ammonium sulphate sublimes, but on the other hand the rate of reaction is increased. It is an advantage to use the aluminum hydroxide in excess. Because aluminum hydroxide is not available in larger quantities in the process, it was tried to use the aluminum oxide produced from the decomposition of the aluminum sulphate. This aluminum oxide may still contain a little basic aluminum sulphate. Despite the non-reactive properties of this highly heated oxide, it could also be used for driving off the ammonia, but must be used in larger excess than the hydroxide. The heating is best done in an atmosphere of nitrogen, that minimizes the dissociation of ammonia.

If free ammonia is not desired, the alum may be mixed with aluminum hydroxide, or alumina and heated in an atmosphere of an acid. This combination of treatment gives a very high yield of ammonia. If, for example, the mixture is heated in a current of sulphur dioxide, the ammonia goes over completely as ammonium sulphite and very little ammonium sulphate. By this method the products of dissociation, ammonia and sulphur trioxide, are instantly combined, ammonia to an ammonium salt subliming without loss, and sulphur trioxide to aluminum sulphate, thus, the losses of both ammonia and sulphuric acid are minimized.

It is well known that aluminous materials, such as clay, can be decomposed with ammonium sulphate by heating. For economical reasons this method has not been used for practical purposes, because of heavy losses of the costly ammonia, especially high on account of the excess ammonium sulphate, that must be employed to secure a high yield of aluminum sulphate from the clay.

By applying the methods for the decomposition of the ammonium alum described above an aluminous material or silicates in general can be decomposed with ammonium sulphate with practically no loss of ammonia. For example, a clay was slowly heated with ammonium sulphate up to 425° C. in a current of sulphur dioxide. At the same time as a good yield from the clay was obtained, practically all ammonia was recovered as ammonium sulphite. For practice the ammonium sulphite may be treated with sulphuric acid so as to form ammonium sulphate and sulphur dioxide to be used again for decomposition. It is preferable to use some steam together with the sulphur dioxide. Of course, any suitable acid or gas mentioned above may be used for the decomposition, for example, hydrochloric acid, in order to recover the ammonia as ammonium chloride, or nitrogen for recovery of free ammonia.

In case of producing alumina from aluminum sulphate, the sulphate may be decomposed by direct heating into alumina and sulphur oxides. It is known, that by this decomposition always some sulphur trioxide is reduced by dissociation to sulphur dioxide. For example, if the sulphate is decomposed at temperatures between 800° C. and 900° C., a temperature range suitable for practical purposes, 10 to 15% of the sulphur trioxide is reduced. However, this loss of sulphur trioxide can be essentially decreased by reducing the dissociation of sulphur trioxide into sulphur dioxide and oxygen. This can be accomplished by decomposing the sulphate in an atmosphere of sulphur dioxide or oxygen. At the temperature range 800-900° C. aluminum sulphate was decomposed practically without loss of sulphur trioxide by using a current of sulphur dioxide passing over the sulphate. In practice the sulphur trioxide formed may be absorbed in concentrated sulphuric acid, thus, separated from the sulphur dioxide, that may be used again; or the gas mixture may be transferred to a plant for sulphuric acid.

For production of alumina the ammonium alum, preferably dried, may be decomposed in one operation, for example, by passing hot sulphur dioxide over the material. The hot gases from the decomposition of the aluminum sulphate are then utilized for the sublimation of the ammonium sulphate in the alum.

The method of decomposing aluminum sulphate in an atmosphere of sulphur dioxide or oxygen may, of course, be applied to other sulphates, for example, ferric sulphate, that now is used for the production of sulphur trioxide for recovery of sulphuric acid.

What I claim is:

1. In the process for production of aluminum compounds the step of sulphatizing a material by heating the material with anhydrous ammonium sulphate in an atmosphere substantially consisting of one or more gases formed by the dissociation of ammonium sulphate and containing substantially no oxygen.

2. In the process for production of aluminum compounds the step of sulphatizing a material by heating the material with anhydrous ammonium sulphate in an atmosphere substantially consisting of sulphur dioxide.

3. In the process for production of aluminum compounds the step of sulphatizing a material by heating the material with anhydrous ammonium sulphate in an atmosphere substantially consisting of sulphur dioxide and nitrogen.

4. A method for sulphatization of a material whereby the material is mixed with anhydrous ammonium sulphate and the mixture heated in an atmosphere substantially consisting of gases minimizing the dissociation and decomposition of ammonia in order to recover the ammonia content of the ammonium sulphate.

5. In the process for production of aluminum compounds the step of heating ammonium alum to form aluminum sulphate in an atmosphere substantially consisting of one or more gases formed by the dissociation of ammonium sulphate and containing substantially no oxygen.

6. In the process for production of aluminum compounds the step of heating ammonium alum to form aluminum sulphate in an atmosphere substantially consisting of sulphur dioxide.

7. In the process for production of aluminum compounds the step of heating ammonium alum to form aluminum sulphate in an atmosphere substantially consisting of sulphur dioxide and nitrogen.

8. In the process for the production of aluminum compounds the step of recovering ammonium sulphate from ammonium alum by heating the alum in an atmosphere substantially consisting of one or more gases formed by the dissociation of ammonium sulphate and containing substantially no oxygen.

9. In the process for the production of aluminum compounds the step of recovering ammonium sulphate from ammonium alum by heating the alum in an atmosphere substantially consisting of sulphur dioxide.

10. In the process for the production of aluminum compounds the step of recovering ammonium sulphate from ammonium alum by heating the alum in an atmosphere substantially consisting of sulphur dioxide and nitrogen.

11. In the process for production of aluminum compounds the steps of sulphatizing the aluminous raw material with anhydrous ammonium sulphate by heating the mixture in an atmosphere substantially consisting of one or more gases formed by the dissociation of ammonium sulphate and containing substantially no oxygen, and decomposing the ammonium alum produced from the sulphatized material to form aluminum sulphate by heating the alum in an atmosphere substantially consisting of one or more gases formed by the dissociation of ammonium sulphate and containing substantially no oxygen.

12. In the process for production of aluminum compounds the steps of sulphatizing the aluminous raw material with anhydrous ammonium sulphate by heating the mixture in an atmosphere substantially consisting of sulphur dioxide, and decomposing the ammonium alum produced from the sulphatized material to form aluminum sulphate by heating the alum in an atmosphere substantially consisting of sulphur dioxide.

13. In the process for production of aluminum compounds the steps of sulphatizing the aluminous raw material with anhydrous ammonium sulphate by heating the mixture in an atmosphere substantially consisting of sulphur dioxide and nitrogen, and decomposing the ammonium alum produced from the sulphatized material to form aluminum sulphate by heating the alum in an atmosphere substantially consisting of sulphur dioxide and nitrogen.

14. In the process for production of aluminum compounds from an aluminous raw material the steps of decomposing ammonium alum to form aluminum sulphate by heating the alum in an atmosphere substantially consisting of one or more gases formed by the dissociation of ammonium sulphate and containing substantially no oxygen, and recovering the ammonium salts formed by the sublimation.

15. In the process for production of aluminum compounds from an aluminous raw material the steps of decomposing ammonium alum to form aluminum sulphate by heating the alum in an atmosphere substantially consisting of sulphur dioxide, and recovering the ammonium salts formed by the sublimation.

16. In the process for production of aluminum compounds from an aluminous raw material the steps of decomposing ammonium alum to form aluminum sulphate by heating the alum in an atmosphere substantially consisting of sulphur dioxide and nitrogen, and recovering the ammonium salts formed by the sublimation.

17. A method for sublimation of an ammonium salt by heating the salt in an atmosphere substantially consisting of one or more gases formed by the dissociation of ammonium sulphate and containing substantially no oxygen.

18. In the process for production of aluminum compounds the step of heating ammonium alum with alumina to form aluminum sulphate in an atmosphere substantially consisting of one or more gases formed by the dissociation of ammonium sulphate and containing substantially no oxygen.

19. In the process for the production of aluminum compounds the step of recovering the ammonia content in ammonium alum by heating the alum with alumina to form aluminum sulphate in an atmosphere substantially consisting of one or more gases formed by the dissociation of ammonium sulphate and containing substantially no oxygen.

In testimony whereof I affix my signature.
BENGT R. F. KJELLGREN.